US012627986B2

(12) United States Patent
Wilson et al.

(10) Patent No.: US 12,627,986 B2
(45) Date of Patent: May 12, 2026

(54) DERIVED CREDENTIAL SERVICE FOR IMPLEMENTING DELEGATED FUNCTIONS

(71) Applicant: Verizon Patent and Licensing Inc., Basking Ridge, NJ (US)

(72) Inventors: Stuart G Wilson, York (GB); Robert D Hopley, Lunenburg, MA (US); Bjorn Hjelm, Livermore, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 155 days.

(21) Appl. No.: 18/212,239

(22) Filed: Jun. 21, 2023

(65) Prior Publication Data

US 2024/0430687 A1     Dec. 26, 2024

(51) Int. Cl.
| | |
|---|---|
| *G06F 21/00* | (2013.01) |
| *H04W 12/069* | (2021.01) |
| *H04W 12/084* | (2021.01) |
| *H04W 12/72* | (2021.01) |

(52) U.S. Cl.
CPC ......... *H04W 12/72* (2021.01); *H04W 12/069* (2021.01); *H04W 12/084* (2021.01)

(58) Field of Classification Search
CPC .. H04W 12/169; H04W 12/084; H04W 12/72
See application file for complete search history.

(56) References Cited

U.S. PATENT DOCUMENTS

| | | | | |
|---|---|---|---|---|
| 2013/0067552 A1* | 3/2013 | Hawkes | ................ | H04W 12/08 726/7 |
| 2024/0340282 A1* | 10/2024 | Bode | ................... | H04L 63/0876 |
| 2024/0365116 A1* | 10/2024 | Lake | .................... | H04W 12/35 |

* cited by examiner

*Primary Examiner* — Jeffrey C Pwu
*Assistant Examiner* — Thong P Truong

(57) ABSTRACT

One or more computing devices, systems, and/or methods for hosting a derived credential service for implementing delegated functions are provided. Credentials of a hardware module within a device and authentication of the device with a core network are used to generate a derived credential. The derived credential is mapped to a subscriber associated with the device so that the derived credential service can perform delegated functions over a network, different than the core network, on behalf of the device.

20 Claims, 9 Drawing Sheets

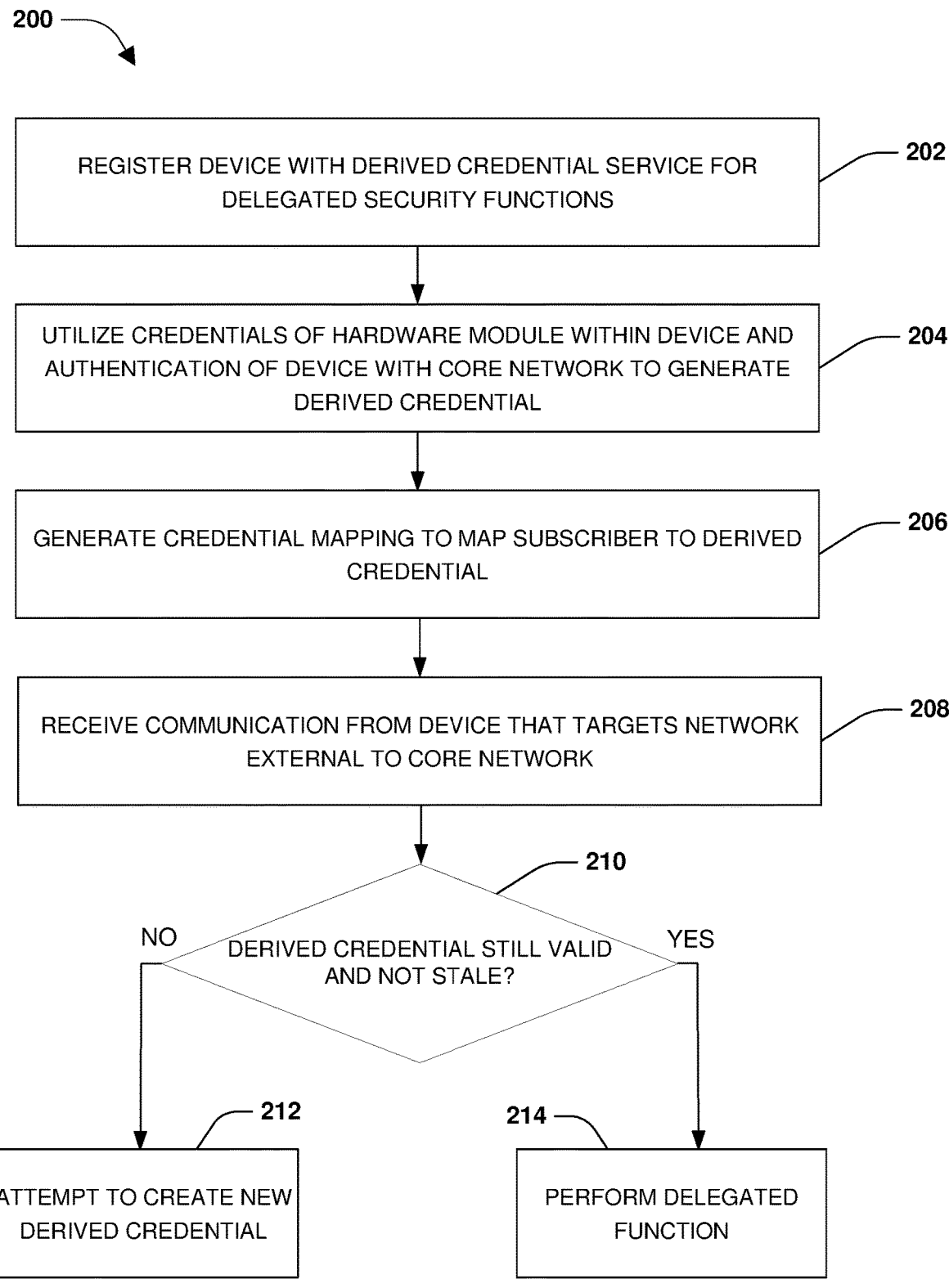

200

REGISTER DEVICE WITH DERIVED CREDENTIAL SERVICE FOR
DELEGATED SECURITY FUNCTIONS — 202

UTILIZE CREDENTIALS OF HARDWARE MODULE WITHIN DEVICE AND
AUTHENTICATION OF DEVICE WITH CORE NETWORK TO GENERATE
DERIVED CREDENTIAL — 204

GENERATE CREDENTIAL MAPPING TO MAP SUBSCRIBER TO DERIVED
CREDENTIAL — 206

RECEIVE COMMUNICATION FROM DEVICE THAT TARGETS NETWORK
EXTERNAL TO CORE NETWORK — 208

210

DERIVED CREDENTIAL STILL VALID
AND NOT STALE?

NO          YES 212          214

ATTEMPT TO CREATE NEW
DERIVED CREDENTIAL

PERFORM DELEGATED
FUNCTION

FIG. 2

DERIVED CREDENTIAL SERVICE FOR IMPLEMENTING DELEGATED FUNCTIONS

BACKGROUND

Many types of devices such as mobile phones, tablets, smart devices, and other devices use hardware modules for authentication with a core network. For example, a wearable smart device of a subscriber includes a subscriber identity module (SIM) card that stores identification information used by a wireless core network to locate, identify, and authenticate the wearable smart device. In particular, the SIM card stores network-specific information used to authenticate and identify the subscriber of the device, such as an international mobile subscriber identity (IMSI) number, an integrated circuit card identifier (ICCID) and related key, security authentication information, and/or other credentials. In this way, the core network can authenticate a device for communicating over the core network.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 2 is a flow chart illustrating an example method for a derived credential service that implements delegated functions, in accordance with an embodiment of the present technology;

DETAILED DESCRIPTION OF EXAMPLE EMBODIMENTS

Figure 1:
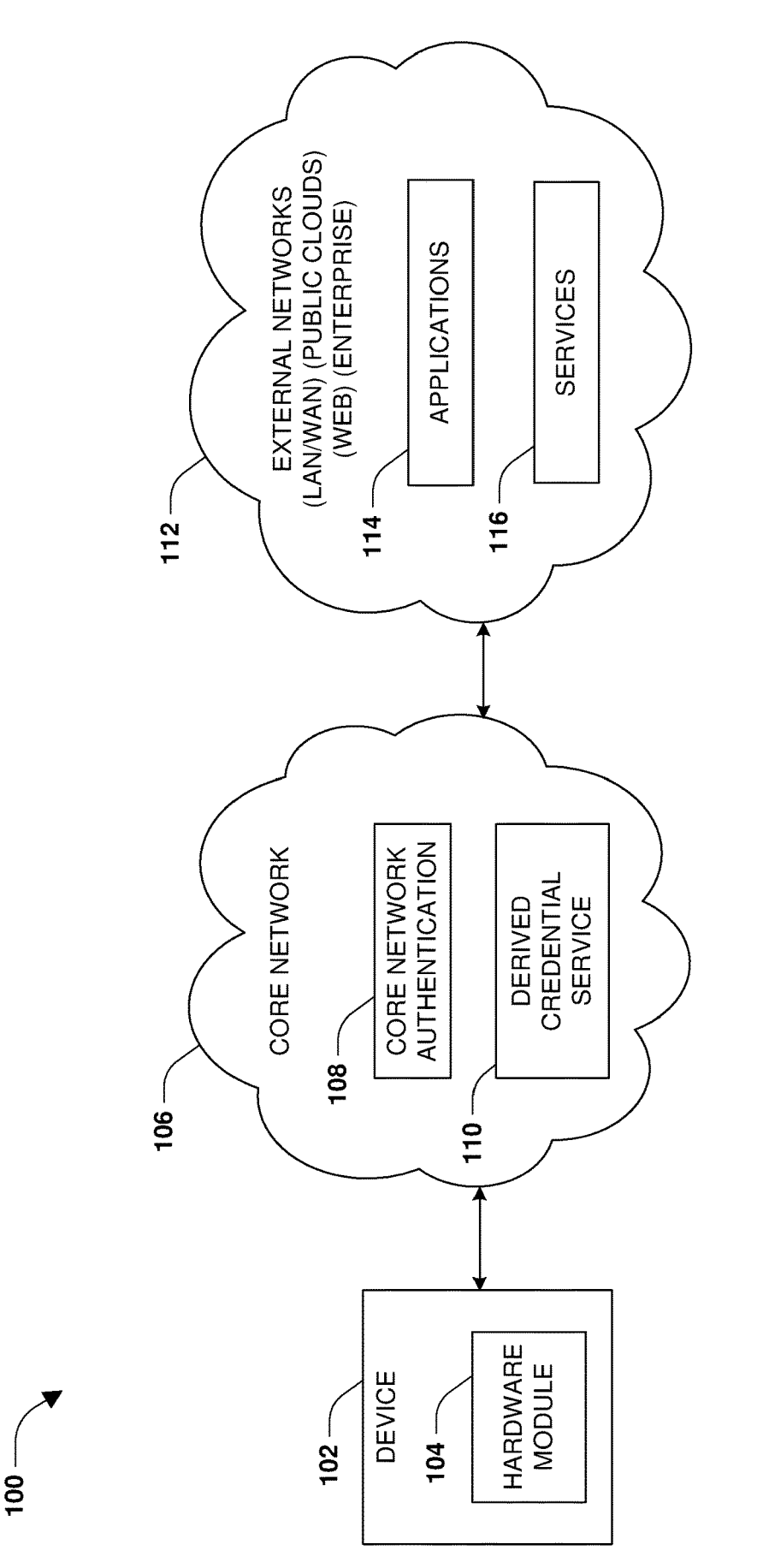
FIG. 1 is a diagram illustrating an example of a system for a derived credential service that implements delegated functions, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

One or more systems and/or techniques for a derived credential service that implements delegated functions are provided. Devices connect to a core network, such as a wireless core network, in order to communicate over the core network and/or other networks accessible from the core network. In order for a device to successfully connect with the core network (e.g., a mobile device connecting to a 4G network, a 5G network, a 3GPP network, or any other cellular or communication network), the device authenticates with the core network.

As part of authenticating with the core network in order to communicate over the core network, the device utilizes credentials known only to the device and the core network. The credentials may be stored within a hardware module of the device. The hardware module may comprise a subscribe identity module (SIM) card, a universal integrated circuit card (UUIC), an embedded universal integrated circuit card (eUUIC), an integrated universal integrated circuit card (iUUIC), or any other hardware module used to store the credentials such as authentication information (e.g., an authentication key shared between the core network and the device) that the device can use to authenticate with the core network. The hardware module may store various information such as a subscriber identity (e.g., an internal mobile subscriber identity or an international mobile equipment identity), a location and phone number of the device, network authorization data, personal security keys, contact lists, stored text messages, and/or other information. Once authenticated, the device is allowed to communicate over the core network.

In order to securely access other networks, services, and applications, the device may separately authenticate over the other networks with the services and applications. This can be accomplished through agent security services. However, agent security services are problematic for mobile devices, internet of things (IoT) devices, machine-to-machine (M2M) communication (e.g., point-to-point communicate between machines, sensors, and hardware over a network) because there is a lack of control over such devices.

Accordingly, the techniques provided herein implement a derived credential service that is capable of generating a derived credential for the device based upon credentials of the hardware module (e.g., a shared key between the device and the core network) and authentication of the device with the core network. The derived credential may be generated as new credentials such as a private/public key pair with a certificate, a symmetric key, a token, a certificate (x509), a mapping from a wireless identity via the derived credential to an active directory/LDAP (lightweight directory access protocol) identity that has a group policy, etc. The derived credential service can utilize the derived credential to perform delegated functions over a different network and with various services and applications on behalf of the device without impacting the device. That is, the delegated functions are performed by the derived credential service on behalf of the device so that there is no impact upon the device where there are no additional requirements, functionality, or other configuration imposed upon the device.

The delegated functions performed by the derived credential service may correspond to creating a virtual private network (VPN) connection to a different network (e.g., creating a secure VPN tunnel from the device to an enterprise network) using the derived credential. The delegated security functions performed by the derived credential service may correspond to providing security services beyond the core network with applications and services hosted by different networks. The delegated functions performed by the derived credential service may correspond to facilitating remote signing capabilities where the derived credential service can enable remote signing services relying on the established derived credential. The delegated functions performed by the derived credential service may correspond to providing zero trust network access using the derived credential (e.g., a security framework that provides secure remote access to an organization's applications, data, and services and/or secure remote access to third party applications based on defined access control policies and secure boundaries, where access is authenticated and authorized using credentials of the subscriber to authorize the subscriber to access certain resources and does not rely on implicit trust). The delegated functions performed by the derived credential service may correspond to implementing an identity management system (IDMS) that uses credentials of the subscriber to authorize the subscriber to access certain resources. The delegated functions performed by the derived credential service may correspond to providing additional confidentiality services, authentication services, and integrity services.

It may be appreciated that a variety of other delegated functions may be performed beyond implementing a security function. In some embodiments, the derived credential may be used to offer enhanced quality of service for a subscriber. In some embodiments, the derived credential may be used to provide access to increased cyber resources.

FIG. 1 is a diagram illustrating an example of a system 100 for a derived credential service 110 that implements delegated functions. A device 102 includes a hardware module 104 (e.g., a SIM card, a UICC, etc.) that stores credentials such as authentication information for the device 102 and a subscriber that uses the device 102. The credentials can be used by the device 102 to authenticate with and to connect to a core network 106. The credentials may correspond to a key that is shared between the core network 106 and the device 102. The device 102 may include a wireless device, a mobile phone, a smart device, an IoT device, and/or a variety of other devices capable of connecting to the core network 106 and authenticating with core network authentication 108 using the credentials stored within the hardware module 104. The core network 106 may correspond to any type of network transport, such as a 4G network, a 5G network, a 3GPP network, etc.

The derived credential service 110 of the core network 106 creates a derived credential for the device 102 and subscriber. The derived credential may comprise a token, a private/public key pair with a certificate, a symmetric key such as an advanced encryption standard (AES) symmetric key, a token such as a Kerberos Token, etc. The derived credential may be created utilizing a privacy preserving technique that anonymizes the derived credential for preserving an anonymity of the subscriber (e.g., the derived credential does not comprise identifiable subscriber information).

The derived credential service 110 may store the derived credential within a credential mapping (e.g., a profile) that maps the derived credential to the subscriber and/or the device 102. When the device 102 authenticates with the core network authentication 108 of the core network 106 using the credentials stored within the hardware module 104, the derived credential service 110 will perform a delegated function on behalf of the device 102 using the derived credential. In some embodiments, the delegated function may relate to performing confidentiality services, authentication services, and/or integrity services on behalf of the device 102 and/or the subscriber with applications 114 and/or services 116 hosted within external networks 112 separate from the core network 106. The applications 114 and services 116 may be hosted within external networks 112, such as a LAN/WAN network, a public cloud, the web, an enterprise network, etc. The delegated function is performed by the derived credential service 110 on behalf of the device 102 without impacting the device 102 and without the device 102 having to be configured with and/or execute additional functionality, and thus there are no additional requirements or constraints placed upon the device 102 in order for the delegated function to be performed.

FIG. 2 is a flow chart illustrating an example method 200 for a derived credential service that implements delegated functions. A device of a subscriber may connect to and authenticate with a core network using credentials (authentication information) stored within a hardware module such as a subscriber identity module (SIM) card, a universal integrated circuit card (UICC), or other module. The credentials may correspond to a key that is shared between the core network 106 and the device 102, which is stored within the hardware module of the device. During operation 202 of method 200, the device may be registered with a derived credential service configured to perform delegated functions on behalf of the device. In some embodiments, the derived credential service may be hosted within the core network. In some embodiments, the derived credential service may be hosted external to the core network such as through a cloud computing environment, at a multi-access edge computing (MEC) environment, a network edge, etc. In some embodiments, the derived credential service is hosted external to the device (e.g., the derived credential service may be hosted on-demand as a container or other service external to the device).

During operation 204 of method 200, the derived credential service may utilize the credentials of the hardware module within the device and authentication of the device with the core network to generate a derived credential for the subscriber. In some embodiments, the derived credential comprises a private/public key with a certificate, a token, a symmetric key, or other authentication information. The derived credential may be generated utilizing a privacy preserving technique to anonymize the derived credential for preserving an anonymity of the subscriber (e.g., the derived credential excludes identifiable information about the subscriber).

During operation 206 of method 200, a credential mapping (e.g., a profile or any other data structure) may be generated to map the derived credential to the subscriber and/or the device. In some embodiments, the credential mapping maps a mobile equipment identifier of the device (e.g., an international mobile equipment identity) to the derived credential, and thus the mobile equipment identifier can be used by the derived credential service to search credential mappings in order to locate the credential mapping that maps the mobile equipment identifier to the derived credential for accessing the derived credential. The credential mapping is used by the derived credential service to perform delegated functions with applications, services, and/or networks hosted external to the core network.

When the device authenticates with the core network using the credentials of the hardware module, communication from the device to a network external to the core network (e.g., communication targeting an application or service hosted by the web, an enterprise network, a public cloud, a LAN/WAN network, etc.) is routed to the derived credential service, during operation 208 of method 200. The derived credential service may identify the credential mapping that corresponds to the device/subscriber in order to access the derived credential that is mapped by the credential mapping to the device/subscriber.

During operation 210 of method 200, the derived credential service determines whether the derived credential is stale or still valid by performing a verification check. In some embodiments, the verification check determines whether the device has connected to the core network within a threshold timespan. If the device has not connected to the core network within the threshold timespan, then the derived credential may be considered stale. In some embodiments, the verification check may determine whether the hardware module has been deactivated. If the hardware module has been deactivated, then the derived credential may be considered stale. If the derived credential is stale, then the derived credential is invalidated (e.g., the credential mapping is deleted or marked as invalid) and the derived credential service attempts to create a new derived credential for the device and subscriber, during operation 212 of method 200. In some embodiments, the derived credential service registers a call back or web hook with the core network so that the derived credential service is notified of any changes to the state of that subscriber.

If the derived credential is not stale, then the derived credential service performs a delegated function over the network with the service or application on behalf of the device, during operation 214 of method 200. A variety of delegated functions may be performed on behalf of the device. In some embodiments, the derived credential service performs the delegated function to establish a virtual private network connect from the device to the network external to the core network. In some embodiments, the derived credential service performs the delegated function to facilitate remote signing capabilities where the derived credential service can enable remote signing services relying on the established derived credential. In some embodiments, the derived credential service performs the delegated function to perform zero trust network access to the network external to the core network. In some embodiments, the derived credential service performs the delegated function to provide integrity verification, authentication, confidentiality, and/or secure communication from the device to an application or service hosted within the network external to the core network. In this way, the delegated function is offloaded from the device to the derived credential service so that performance of the delegated function does not impact the device.

Figure 3A:
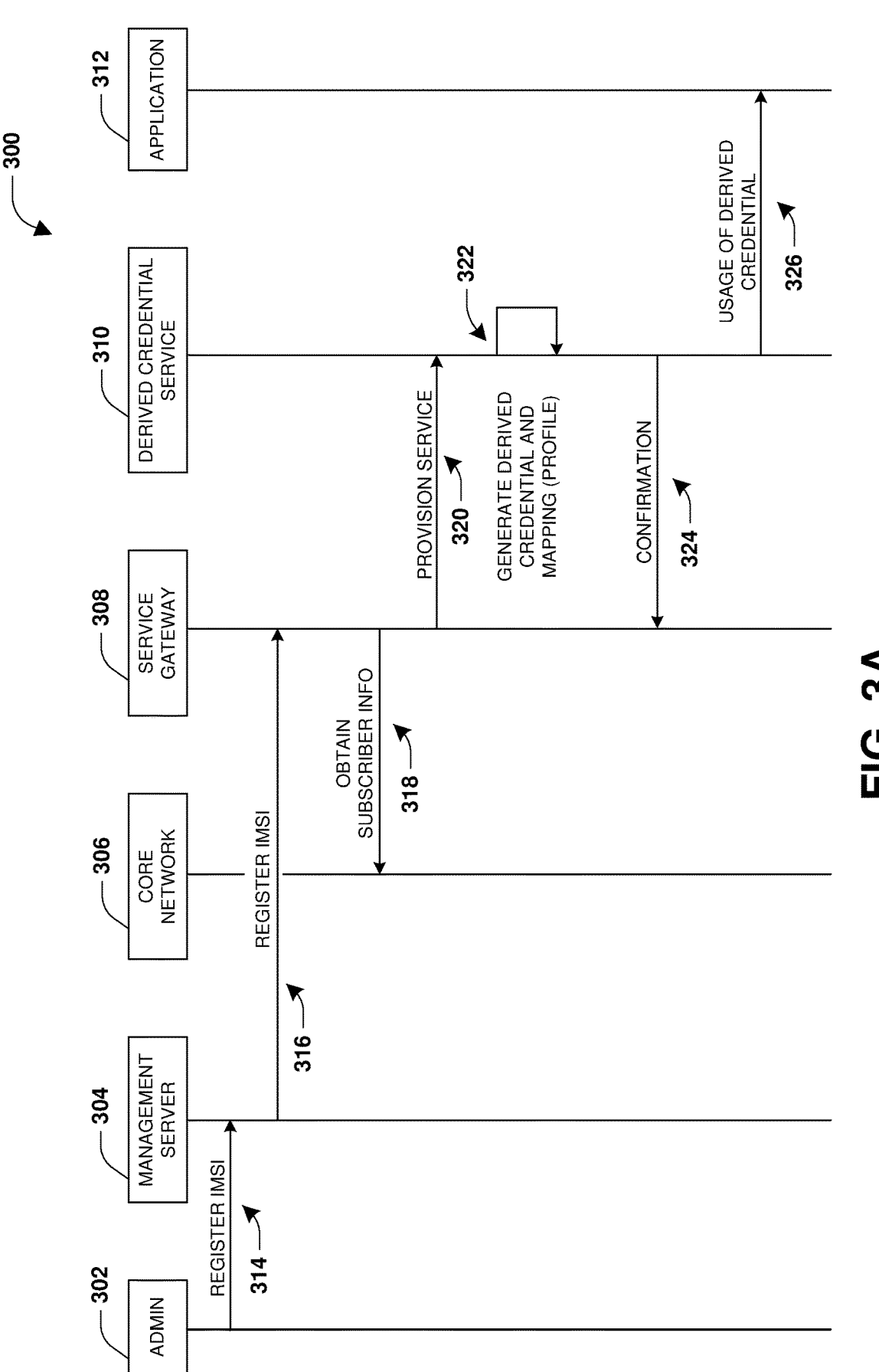
FIG. 3A is a flow chart illustrating an example of registering a device with a derived credential service, in accordance with an embodiment of the present technology.

FIG. 3A is a flow chart illustrating an example of registering a device 350 (device 350 illustrated by FIG. 3B) of a subscriber with a derived credential service 310. An administrator 302 may register 314 an international mobile subscriber identity (IMSI) or other subscriber/device identification information of the device 350 and subscriber through a management server 304 and core network 306 with a service gateway 308. The registration is performed in order to register the subscriber and device 350 with a derived credential service 310 for performing delegated functions on behalf of the device 350. The delegated functions may be performed with applications (e.g., application 312) and services hosted within networks external to the core network 306, such as a LAN/WAN network, a public cloud, the web, an enterprise network, etc.

Upon the service gateway 308 receiving 316 the registration through the core network 306, the service gateway 308 obtains 318 subscriber information of the subscriber from the core network 306. Using the subscriber information, the service gateway 308 provisions 320 the derived credential service 310 (e.g., the derived credential service 310 may be hosted as a service, container, thread, compute, etc.). The derived credential service 310 generates 322 a derived credential and maps the derived credential to the subscriber through a credential mapping (profile) using the subscriber information. The derived credential service 310 sends 324 a confirmation to the service gateway 308. The confirmation indicates that the derived credential and credential mapping has been created for the device and subscriber. The confirmation indicates that communication from the device 350 to the application 312 hosted outside the core network 306 can be routed through the derived credential service 310 that will perform 326 delegated functions using the derived credential on behalf of the device 350 with the application 312 (e.g., establish a security virtual private network connection to the application 312 for the device 350).

Figure 3B:
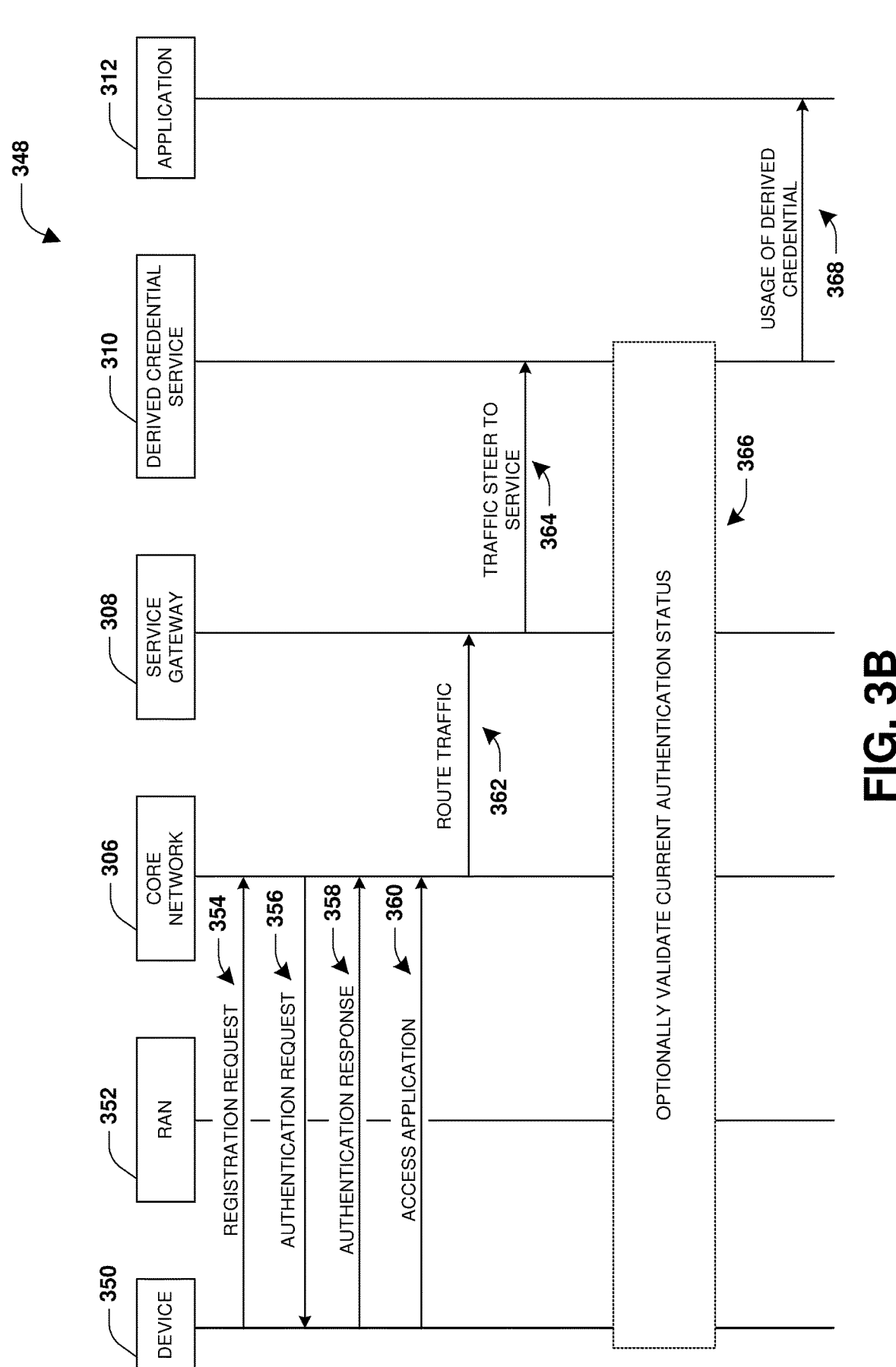
FIG. 3B is a flow chart illustrating an example method for a derived credential service that implements delegated functions, in accordance with an embodiment of the present technology.

FIG. 3B is a flow chart illustrating an example method 348 for the derived credential service 310 that implements delegated functions. The device 350 may connect to a radio access network (RAN) component 352. The device may transmit 354 an attach request through the RAN component 352 to the core network 306 in order to register for communicating over the core network 306. The core network 306 may transmit 356 an authentication request back to the device 350. In response to the device 350 receiving the authentication request, the device 350 transmits 358 an authentication response to the core network 306 in order to authenticate with the core network. The authentication response enables the core network 306 to validate the identity of the device 350.

Once the device 350 has authenticated with the core network 306, the device 350 may transmit 360 subscriber traffic/data to the core network 306 for accessing the application 312 hosted within the network that is external to the core network 306. The core network 306 routes 362 the subscriber traffic/data to the service gateway 308. The service gateway 308 steers 364 the subscriber traffic/data to the derived credential service 310. The credential service 310 may utilize information within the subscriber traffic/data (e.g., along with enrichment data from the core network 306) to identify a credential mapping that is mapped to the device 350. In this way, the derived credential service 310 can obtain the derived credential from the credential mapping.

The derived credential service 310 may optionally validate 366 a current authentication status of the device 350 with the core network 306 such as to verify that the derived credential is not stale. The derived credential service 310 utilizes 368 the derived credential to perform a delegated function between the device 350 and the application 312 as part of implementing the access request from the device 350 to access the application 312.

Figure 4:
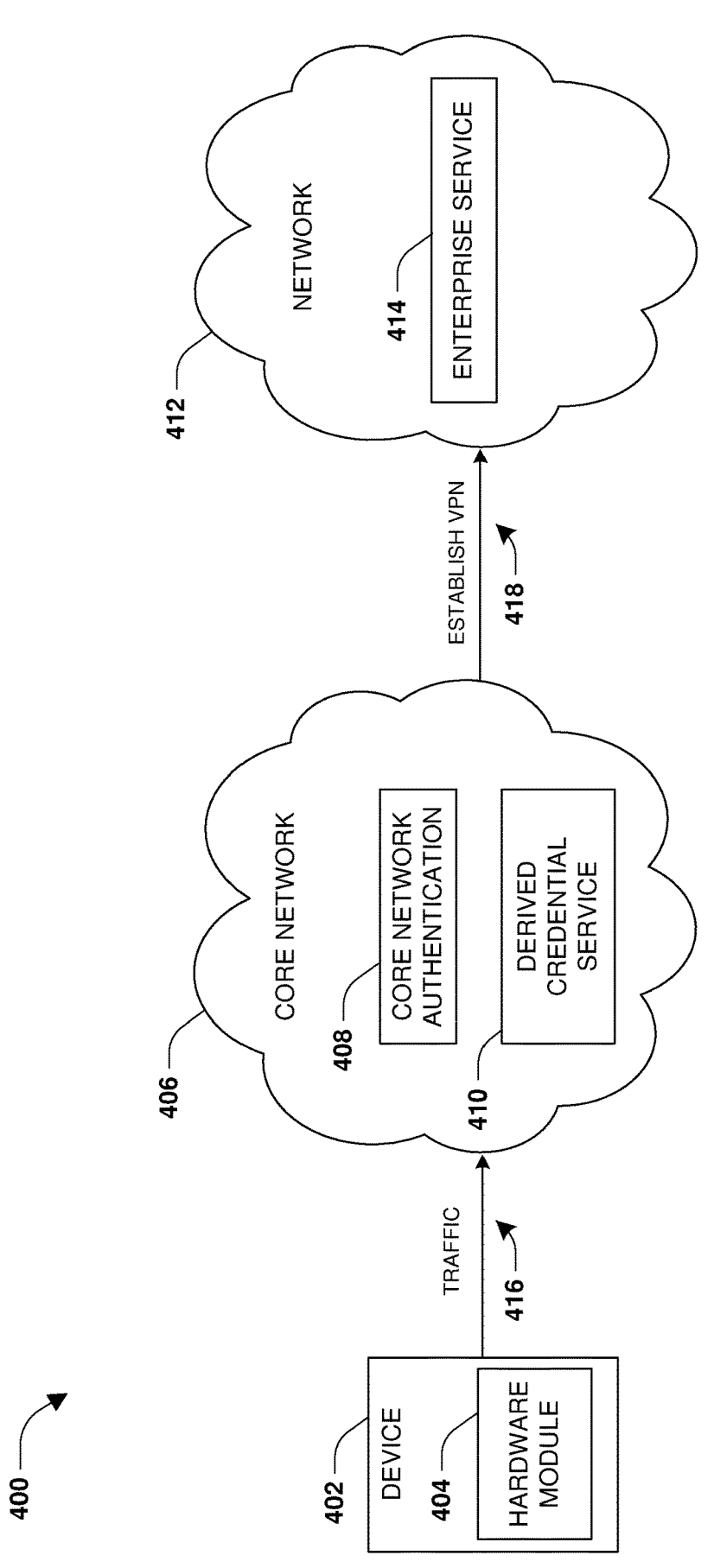
FIG. 4 is a diagram illustrating an example of a system for a derived credential service that implements delegated functions, in accordance with an embodiment of the present technology.

FIG. 4 is a diagram illustrating an example of a system 400 for a derived credential service 410 that implements delegated functions on behalf of a device 402. The device 402 connects to a core network 406 by authenticating with core network authentication 408 using credentials stored within a hardware module 404 of the device 402. The device 402 may be registered with the derived credential service 410 that will perform delegated functions on behalf of the device 402 using a derived credential created for the device 402.

The device 402 may transmit subscriber traffic/data 416 to the core network 406. A configured defined for the subscriber may specify that the subscriber traffic/data 416 is to be routed over a virtual private network once the subscriber traffic/data 416 leaves the core network 406. The core network 406 may route the virtual private network access request 416 to the derived credential service 410. The derived credential service 410 looks up a credential mapping using information about the device 402 and/or a subscriber of the device 402 in order to identify the derived credential. The derived credential service 410 utilizes the derived credential to establish 418, on behalf of the device 402, a virtual private network connection between the device 402 and the enterprise service 414 hosted within the network 412 external to the core network 406.

Figure 5:
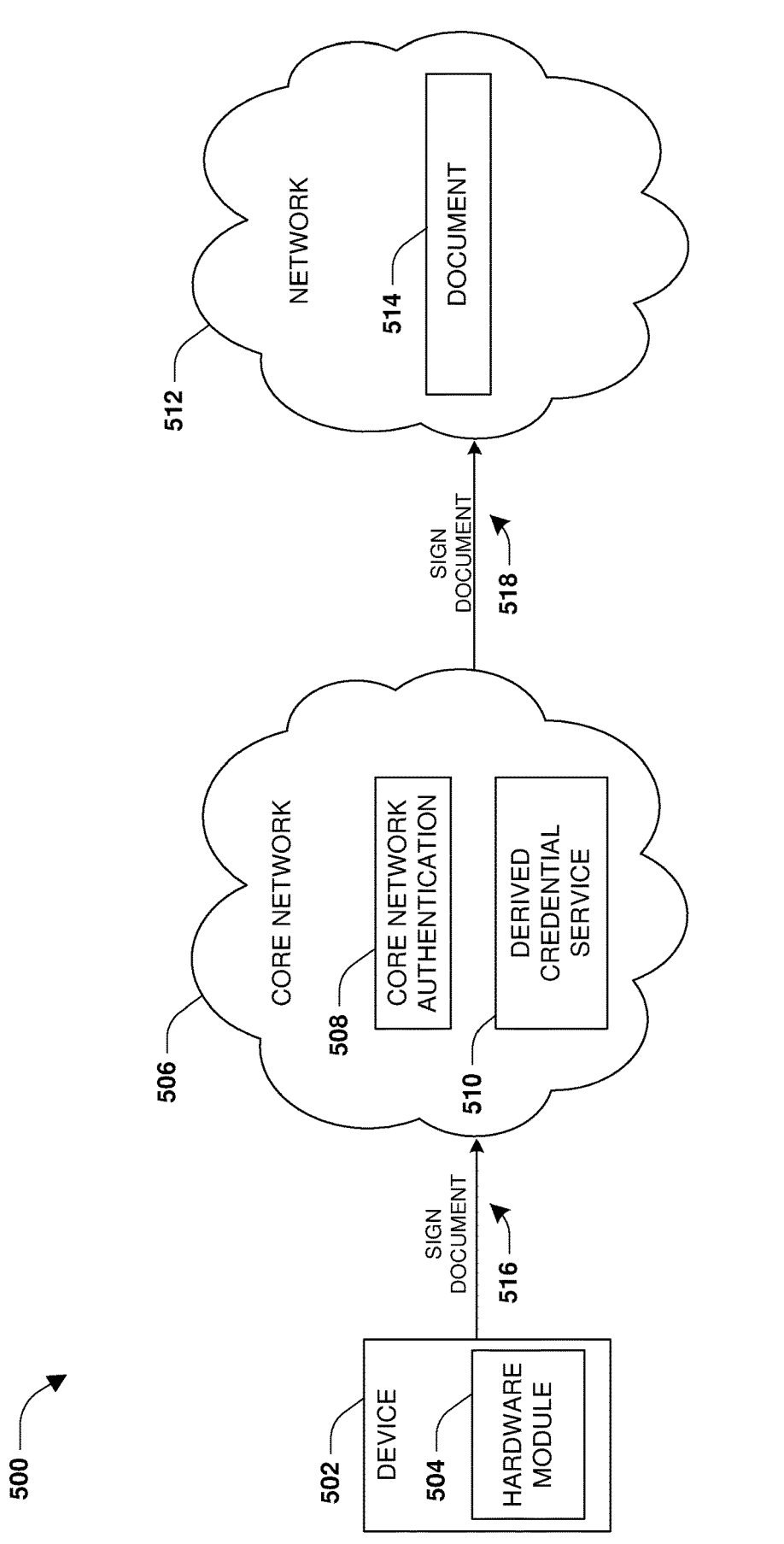
FIG. 5 is a diagram illustrating an example of a system for a derived credential service that implements delegated functions, in accordance with an embodiment of the present technology.

FIG. 5 is a diagram illustrating an example of a system 500 for a derived credential service 510 that implements delegated functions on behalf of a device 502. The device 502 connects to a core network 506 by authenticating with core network authentication 508 using credentials stored within a hardware module 504 of the device 502. The device 502 may be registered with the derived credential service 510 that will perform delegated functions on behalf of the device 502 using a derived credential created for the device 502.

The device 502 may transmit a document signature request 516 to the core network 506. The document signature request 516 may specify that the device 502 is attempting to sign a document 514 stored within a network 512 external to the core network 506 (e.g., a user or subscriber is using the device is attempting to digitally sign mortgage documents through a document signing service hosted by the network 512). In some embodiments, a subscriber may be a person or organization that has a billable account with a communication provider of the core network 506 (e.g., a wireless service provider). A user of a device may be a person that is interfacing with the device, and the user may be the subscriber or a different person. The core network 506 may route the document signature request 516 to the derived credential service 510. The derived credential service 510 looks up a credential mapping using information about the device 502 and/or a subscriber of the device 502 in order to identify the derived credential. The derived credential service 510 utilizes the derived credential to authenticate, on behalf of the device 502, with the document signing service in order for the subscriber to sign 518 the document 514 through the document signing service hosted by the network 512 separate from the core network 506.

In some embodiments of a derived credential service implementing delegated service functions on behalf of a device, the device is registered for zero trust network access through the derived credential service. The zero trust network access may be registered as a privileged application function in a network. The device such as user equipment (UE) is provisioned with a SIM and is registered with a cellular core network. An administrator assigns the UE to the derived credential service (e.g., a zero trust network access SIM agent service) through a management server. The management server provisions the derived credential service with a representation of the SIM and a mapping to a derived credential (e.g., a public/private key pair and certificate or a symmetric key obtained using authentication and management for applications in 5G). The management server provisions the derived credential service with connection parameters to establish a secure tunnel with an external cloud platform, data network, application, etc. This embodiment could enable other security functions such as policy, enforcement, anomaly detection, threat prevention, etc.

In some embodiments of a derived credential service implementing delegated service functions on behalf of a device, the derived credential is used with an identity management system (IDMS) in a network to authenticate the SIM of the device. The identity management system performs authentication of the device in the background. A service gateway is configured for traffic steering based on a customer configuration. A zero trust network access service will consume authentication status and proof from a map of an IMSI/device to a new public key infrastructure (PKI) credential that can be used to establish a secure connection to an enterprise application on principles of zero trust. The identity management system operates as an open ID connect service. When an enterprise customer signs up as a network operation, the enterprise customer configures enterprise applications for access through zero trust network access along with a policy defining who can obtain access. When a device connects to the network and sends packets destined for the enterprise application, the core network (e.g., a 5G core network) routes the packets through the service gateway to a zero trust network access agent that initiates an authentication flow for the device based on the SIM of the device. Once the device can provide that the device authenticated based upon the SIM, the device is mapped to a unique PKI credential hosted by the derived credential service, which is used for secure communication to the enterprise application as its identity.

According to some embodiments, a method may be provided. The method includes generating a derived credential for the subscriber using credentials of a hardware module within a device associated with a subscriber of a core network and authentication of the device with the core network to; generating a credential mapping that maps the subscriber to the derived credential for performing delegated functions with an application hosted by a network external to the core network; in response to the device authenticating with the core network using the credentials of the hardware module, routing, to a derived credential service, communication from the device to the application; and performing, by the derived credential service, a delegated function over the network with the application on behalf of the device based on the credential mapping.

According to some embodiments, the method includes performing the delegated function to establish a virtual private network connection from the device through the network to the application.

According to some embodiments, the method includes performing the delegated function to facilitate a remote signing capability where the derived credential service enables a remote signing service relying on the derived credential.

According to some embodiments, the method includes performing the delegate security function to provide the device with zero trust network access to the network.

According to some embodiments, the method includes performing the delegate security function to provide at least one of integrity verification, authentication, confidentiality, or secure communication from the device to the application.

According to some embodiments, the method includes generating and storing the derived credential and the credential mapping by the derived credential service hosted external to the device, wherein the delegated function is performed on behalf of the device.

According to some embodiments, the credential mapping maps a mobile equipment identifier of the device to the derived credential.

According to some embodiments, the method includes generating the derived credential utilizing a privacy preserving technique to anonymize the derived credential for preserving an anonymity of the subscriber.

According to some embodiments, the method includes performing a verification check to determine whether the derived credential is stale; and in response to determining that the derived credential is stale, invalidating the derived credential and generating a new derived credential.

According to some embodiments, the verification check determines whether the device has connected to the core network within a threshold timespan.

According to some embodiments, the verification check determines whether the hardware module has been deactivated.

According to some embodiments, a computing device comprising memory storing instructions and comprising a processor that executes the instructions to perform operations, is provided. The operations include utilizing credentials of a hardware module within a device associated with a subscriber of a core network and authentication of the device with the core network to generate a derived credential for the subscriber; generating a credential mapping that maps the subscriber to the derived credential for performing delegated functions with a service hosted by a network external to the core network; in response to the device authenticating with the core network using the credentials of the hardware module, routing, to a derived credential service, communication from the device to the service; and utilizing, by the derived credential service, the credential mapping to perform a delegated function over the network with the service on behalf of the device.

According to some embodiments, the derived credential service is hosted within the core network.

According to some embodiments, execution of the delegated function is offloaded from the device to the derived credential service hosted external to the device.

According to some embodiments, the derived credential comprises a private/public key pair with a certificate.

According to some embodiments, the derived credential comprises at least one of a token or a symmetric key.

According to some embodiments, wherein the derived credential service subscribes to the core network for status changes of the device, and wherein the derived credential service utilizes the status changes to determine whether the derived credential is stale.

According to some embodiments, a non-transitory computer-readable medium storing instructions that when executed facilitate performance of operations, is provided. The operations include utilizing credentials of a hardware module within a device associated with a subscriber of a core network and authentication of the device with the core network to generate a derived credential for the subscriber; generating a credential mapping that maps the subscriber to the derived credential for performing delegated functions for a network external to the core network; in response to the device authenticating with the core network using the credentials of the hardware module, routing, to a derived credential service, communication from the device to the network; and utilizing, by the derived credential service, the credential mapping to perform a delegated function over the network on behalf of the device.

According to some embodiments, the hardware module comprises a subscriber identity module (SIM) card.

According to some embodiments, the hardware module comprises a universal integrated circuit card.

Figure 6:
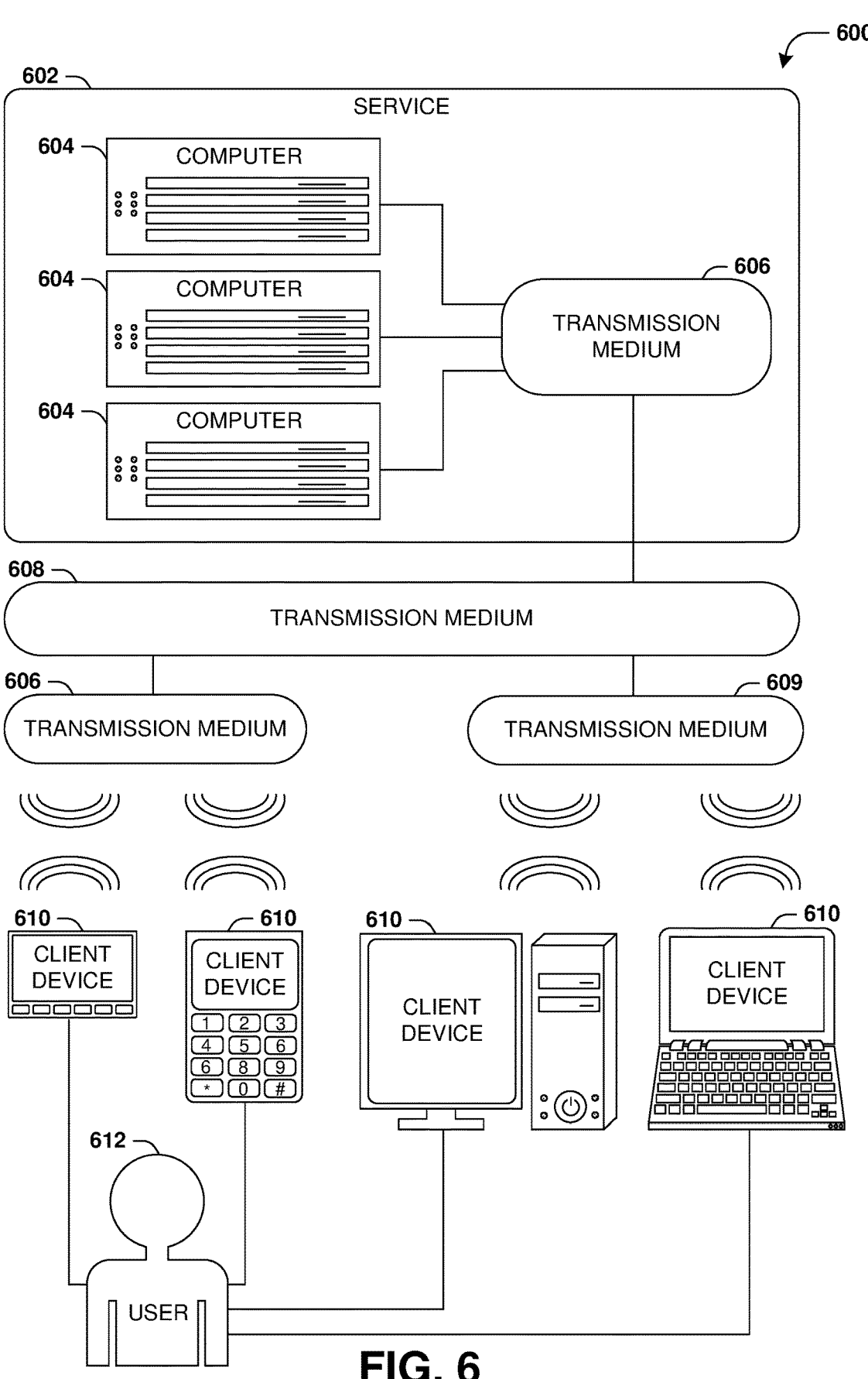
FIG. 6 is an illustration of example networks that may utilize and/or implement at least a portion of the techniques presented herein.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

In some embodiments, the computers 604 may be host devices and/or the client device 610 may be devices attempting to communicate with the computer 604 over buses for which device authentication for bus communication is implemented.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 609 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 602.11) network or a Bluetooth (IEEE Standard 602.15.1) personal area network). In this manner, the computers 604 and the client devices 610 may communicate over various types of transmission mediums.

Figures 7, 8:
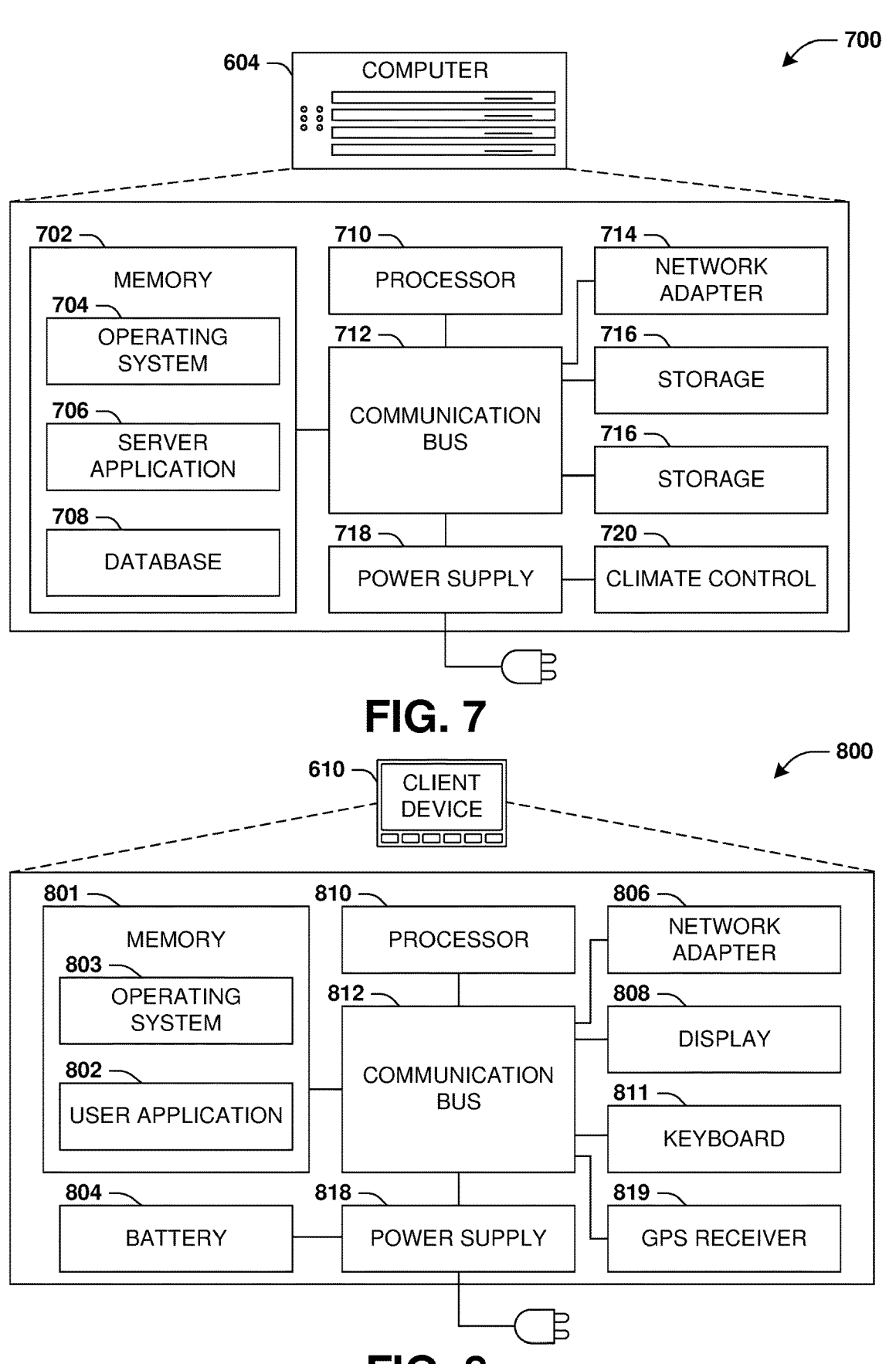
FIG. 7 is an illustration of a scenario involving an example configuration of a computer that may utilize and/or implement at least a portion of the techniques presented herein.
FIG. 8 is an illustration of a scenario involving an example configuration of a client that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
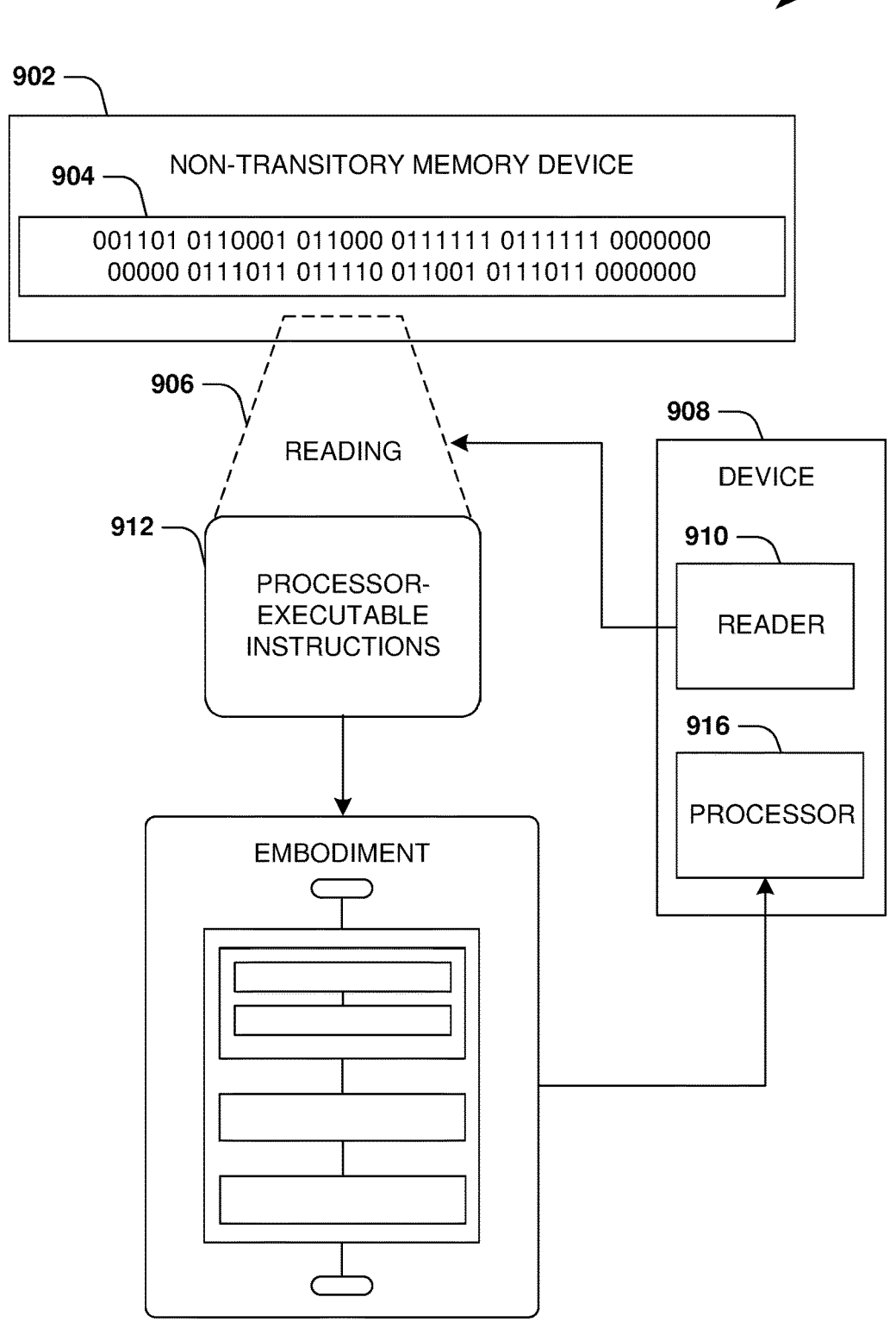
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2 and/or example method 300 of FIGS. 3A and 3B, for example. In some embodiments, the processor-executable instructions 912 are configured to cause implementation of a system, such as at least some of the example system 100 of FIG. 1, at least some of the example system 400 of FIG. 4, and/or at least some of the example system 500 of FIG. 5.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:

generating, by a derived credential service of a cellular core network, a derived credential for a subscriber using (i) credentials of a hardware module within a device associated with the subscriber of the cellular core network and (ii) authentication of the device with the cellular core network;

generating, by the derived credential service of the cellular core network, a credential mapping that maps the subscriber of the cellular core network to the derived credential for performing delegated functions with an application hosted by a network external to the cellular core network, wherein the network external to the cellular core network comprises at least one of a local area network (LAN), a wide area network (WAN), a public cloud, the web or an enterprise network;

in response to the device authenticating with the cellular core network using the credentials of the hardware module within the device associated with the subscriber, routing communication, from the device to the application hosted by the network external to the cellular core network, to the derived credential service of the cellular core network;

identifying, by the derived credential service of the cellular core network, the credential mapping as being mapped to the device associated with the subscriber utilizing the routed communication; and performing, by the derived credential service of the cellular core network, a delegated security function, over the network external to the cellular core network, with the application on behalf of the device based on the credential mapping.

2. The method of claim 1, comprising:

performing the delegated security function to establish a virtual private network connection from the device through the network to the application.

3. The method of claim 1, comprising:

performing the delegated security function to facilitate a remote signing capability where the derived credential service enables a remote signing service relying on the derived credential.

4. The method of claim 1, comprising:

performing the delegated security function to provide the device with zero trust network access to the network.

5. The method of claim 1, comprising:

performing the delegated security function to provide at least one of integrity verification, authentication, confidentiality, or secure communication from the device to the application.

6. The method of claim 1, further comprising:

generating and storing the derived credential and the credential mapping by the derived credential service hosted external to the device, wherein the delegated security function is performed on behalf of the device.

7. The method of claim 1, wherein the credential mapping maps a mobile equipment identifier of the device to the derived credential.

8. The method of claim 1, further comprising generating the derived credential utilizing a privacy preserving technique to anonymize the derived credential for preserving an anonymity of the subscriber.

9. The method of claim 1, comprising:

performing a verification check to determine whether the derived credential is stale; and in response to determining that the derived credential is stale, invalidating the derived credential and generating a new derived credential.

10. The method of claim 9, wherein the verification check determines whether the device has connected to the cellular core network within a threshold timespan.

11. The method of claim 9, wherein the verification check determines whether the hardware module has been deactivated.

12. A computing device comprising memory storing instructions and comprising a processor that executes the instructions to perform operations comprising:

utilizing credentials of a hardware module within a device associated with a subscriber of a cellular core network and authentication of the device with the cellular core network to generate a derived credential for the subscriber of the cellular core network;

generating a credential mapping that maps the subscriber of the cellular core network to the derived credential for performing delegated functions with a service hosted by a network external to the cellular core network, wherein the network external to the cellular core network comprises at least one of a local area network (LAN), a wide area network (WAN), a public cloud, the web or an enterprise network;

in response to the device authenticating with the cellular core network using the credentials of the hardware module within the device associated with the subscriber, routing communication, from the device to the service hosted by the network external to the cellular core network, to a derived credential service;

identifying, by the derived credential service, the credential mapping as being mapped to the device associated with the subscriber utilizing the routed communication; and utilizing, by the derived credential service, the credential mapping to perform a delegated function, over the network external to the cellular core network, with the service on behalf of the device.

13. The computing device of claim 12, wherein the derived credential service is hosted within the cellular core network.

14. The computing device of claim 12, wherein execution of the delegated function is offloaded from the device to the derived credential service hosted external to the device.

15. The computing device of claim 12, wherein the derived credential comprises a private/public key pair with a certificate.

16. The computing device of claim 12, wherein the derived credential comprises at least one of a token or a symmetric key.

17. The computing device of claim 12, wherein the derived credential service subscribes to the cellular core network for status changes of the device, and wherein the derived credential service utilizes the status changes to determine whether the derived credential is stale.

18. A non-transitory computer-readable medium storing instructions that when executed facilitate performance of operations comprising:

utilizing credentials of a hardware module within a device associated with a subscriber of a core network and authentication of the device with the core network to generate a derived credential for the subscriber of the core network;

generating a credential mapping that maps the subscriber of the core network to the derived credential for performing delegated functions for a network external to the core network, wherein at least one of the core network comprises a cellular core network or the network external to the core network comprises at least one of a local area network (LAN), a wide area network (WAN), a public cloud, the web or an enterprise network;

in response to the device authenticating with the core network using the credentials of the hardware module within the device associated with the subscriber, routing communication, from the device to the network external to the core network, to a derived credential service;

identifying, by the derived credential service, the credential mapping as being mapped to the device associated with the subscriber utilizing the routed communication; and utilizing, by the derived credential service, the credential mapping to perform a delegated function, over the network external to the core network, on behalf of the device.

19. The non-transitory computer-readable medium of claim 18, wherein the hardware module comprises a subscriber identity module (SIM) card.

20. The non-transitory computer-readable medium of claim 18, wherein the hardware module comprises a universal integrated circuit card.

* * * * *